US011003046B2

(12) United States Patent
Liscidini et al.

(10) Patent No.: US 11,003,046 B2
(45) Date of Patent: May 11, 2021

(54) SYSTEMS AND METHODS FOR NONLINEAR OPTICAL LIGHT GENERATION USING LINEARLY UNCOUPLED RESONATORS IN INTEGRATED PHOTONIC DEVICES

(71) Applicant: Xanadu Quantum Technologies Inc., Toronto (CA)

(72) Inventors: Marco Liscidini, Pavia (IT); Matteo Menotti, Toronto (CA); Blair Morrison, Toronto (CA); John Sipe, Toronto (CA); Kang Tan, Toronto (CA); Zachary Vernon, Toronto (CA)

(73) Assignee: Xanadu Quantum Technologies Inc., Toronto (CA)

( * ) Notice: Subject to any disclaimer, the term of this patent is extended or adjusted under 35 U.S.C. 154(b) by 0 days.

(21) Appl. No.: 17/108,221

(22) Filed: Dec. 1, 2020

(65) Prior Publication Data

US 2021/0080804 A1 Mar. 18, 2021

Related U.S. Application Data

(63) Continuation of application No. PCT/CA2019/050899, filed on Jun. 27, 2019.
(Continued)

(51) Int. Cl.
*G02F 1/35* (2006.01)
*G02F 1/365* (2006.01)
(Continued)

(52) U.S. Cl.
CPC ....... *G02F 1/3507* (2021.01); *G02B 6/29343* (2013.01); *G02F 1/3503* (2021.01);
(Continued)

(58) Field of Classification Search
None
See application file for complete search history.

(56) References Cited

U.S. PATENT DOCUMENTS 8,032,027 B2 * 10/2011 Popovic ............. G02B 6/29395
398/82
9,531,150 B2 * 12/2016 Ozdemir ............. H01S 3/10092
(Continued)

OTHER PUBLICATIONS

International Search Report and Written Opinion, dated Sep. 11, 2019, for International Patent Application No. PCT/CA2019/050899.

*Primary Examiner* — Rhonda S Peace
(74) *Attorney, Agent, or Firm* — Cooley LLP

(57) ABSTRACT

A photonic device comprises a plurality of resonators and a plurality of optical channels. Each resonator from the plurality of resonators has a set of resonance frequencies independently selected from a set of resonance frequencies of each remaining resonator from the plurality of resonators. Each resonator from the plurality of resonators lacks substantially any linear coupling between each remaining resonator from the plurality of resonators. The plurality of resonators defines a spatial overlap region between at least two resonators from the plurality of resonators such that nonlinear optical processes are substantially optimized during operation. A plurality of optical channels is operatively coupled to the plurality of resonators. The plurality of optical channels is configured to receive light from the plurality resonators and configured to send light into the plurality of resonators.

20 Claims, 6 Drawing Sheets

Related U.S. Application Data

(60) Provisional application No. 62/691,680, filed on Jun. 29, 2018.

(51) Int. Cl.
    *G02B 6/293*    (2006.01)
    *H04B 10/70*    (2013.01)

(52) U.S. Cl.
    CPC ............ *G02F 1/365* (2013.01); *G02F 1/3536* (2013.01); *H04B 10/70* (2013.01)

(56) References Cited

U.S. PATENT DOCUMENTS

| | | |
|---|---|---|
| 9,891,425 B2 * | 2/2018 | Paolella ................ G02B 6/4274 |
| 10,372,014 B1 * | 8/2019 | Vidrighin ................ G02F 1/365 |
| 2006/0197959 A1 | 9/2006 | Barwicz et al. |
| 2016/0041032 A1 | 2/2016 | Matthews et al. |
| 2017/0212405 A1 | 7/2017 | Pant et al. |

* cited by examiner

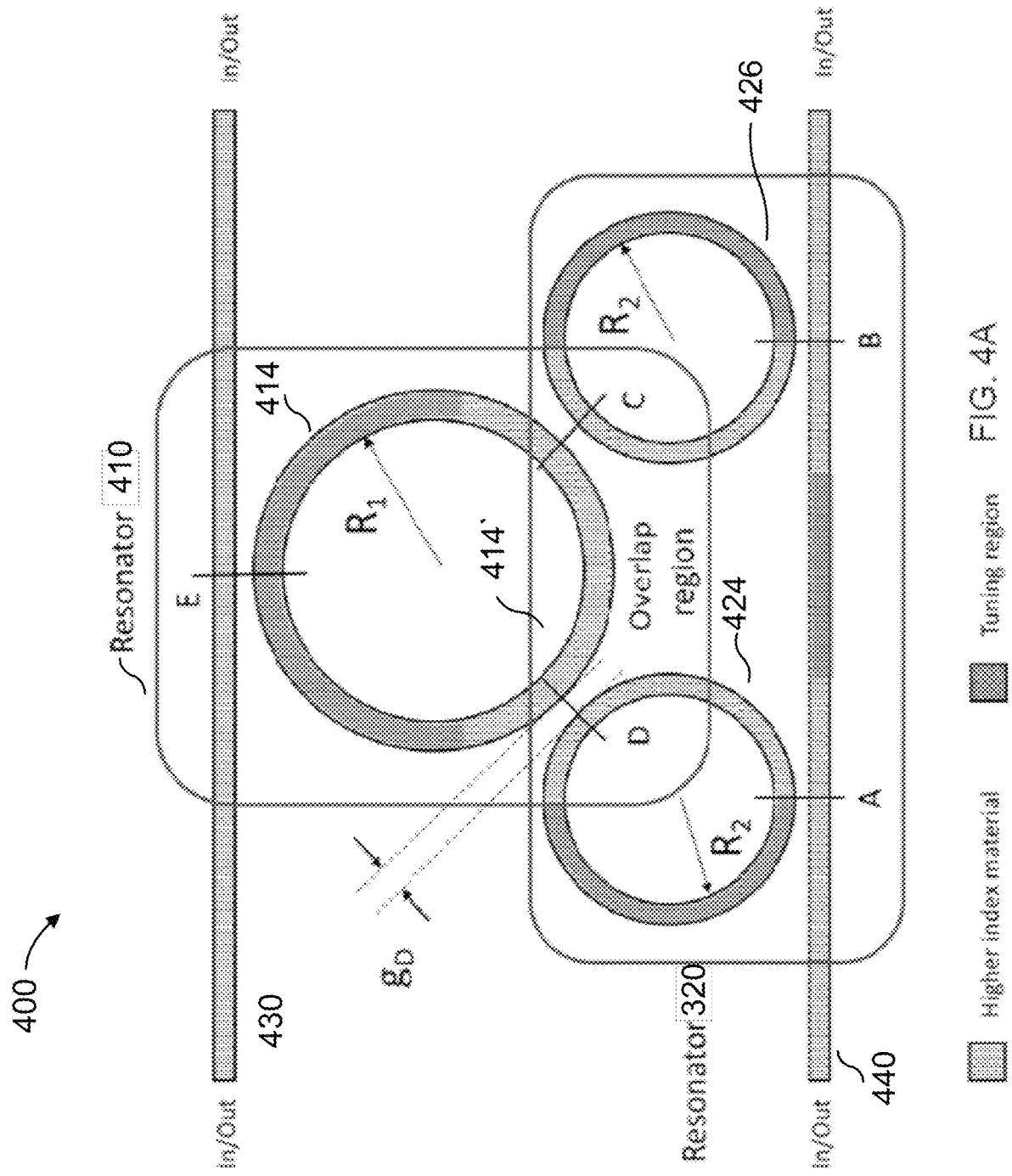

SYSTEMS AND METHODS FOR NONLINEAR OPTICAL LIGHT GENERATION USING LINEARLY UNCOUPLED RESONATORS IN INTEGRATED PHOTONIC DEVICES

CROSS REFERENCE TO RELATED APPLICATIONS

This application is a bypass Continuation of International Patent Application No. PCT/CA2019/050899, filed Jun. 27, 2019 and titled "Systems and Methods for Nonlinear Optical Light Generation Using Linearly Uncoupled Resonators in Integrated Photonic Devices," which claims priority to U.S. Provisional Patent Application No. 62/691,680 filed Jun. 29, 2018, the contents of each of which are incorporated herein by reference in their entireties, for all purposes.

BACKGROUND

The generation of light using parametric nonlinear optical processes is at the core of a host of vital technologies in the modern world. Second harmonic generation (SHG), sum- and difference-frequency generation (SFG and DFG), stimulated four-wave mixing (SFWM), optical parametric oscillation (OPO) and amplification (OPA), cascaded four-wave mixing, and frequency comb generation, are all examples of such known processes. In addition, Raman scattering (RS), either spontaneous, stimulated or coherent, can be to a certain extent considered as another nonlinear parametric process. For example, spontaneous four-wave mixing (SFWM), spontaneous parametric down-conversion (SPDC), and squeezed light generation have found applications in photonic quantum information processing technologies, which are rapidly developing towards the point of commercial viability for solving difficult problems in high-performance computing, machine learning and artificial intelligence, metrology, sensing, and cryptography markets.

While many of these known technologies are typically implemented using bulk and fiber optical elements, recently, integrated nanophotonics has emerged as a promising platform for efficient and scalable devices for parametric nonlinear optical devices. To compensate for the short interaction lengths and relatively weak nonlinearities available in these devices, a resonant structure with high longitudinal and transverse optical confinement can be used to enhance the efficiency of the process. This presents a challenge, as precisely tailoring and tuning such systems to meet the stringent requirements of nonlinear processes can be difficult for simple structures involving a single resonator.

Thus, a need exists for apparatus and methods that use resonant structures within parametric nonlinear optical devices.

SUMMARY

A photonic device comprises a plurality of resonators and a plurality of optical channels. Each resonator from the plurality of resonators has a set of resonance frequencies independently selected from a set of resonance frequencies of each remaining resonator from the plurality of resonators. Each resonator from the plurality of resonators lacks substantially any linear coupling between each remaining resonator from the plurality of resonators. The plurality of resonators defines a spatial overlap region between at least two resonators from the plurality of resonators such that nonlinear optical processes are substantially optimized during operation. A plurality of optical channels is operatively coupled to the plurality of resonators. The plurality of optical channels is configured to receive light from the plurality resonators and configured to send light into the plurality of resonators.

BRIEF DESCRIPTION OF THE DRAWINGS

FIG. 4a shows a diagram of a three-ring photonic device having a first resonator with one ring and a second resonator with two rings, according to an embodiment.

FIG. 4b shows a diagram of the second resonator with two rings of FIG. 4a.

DETAILED DESCRIPTION

A method is described herein by which resonant nonlinear photonic devices can be constructed using an arrangement of multiple integrated optical resonators to generate and manipulate light for both classical and quantum non-linear photonic applications. The integrated optical resonator structures can be fabricated in a diverse range of material platforms including, for example, silicon and its oxides, silicon nitride, III-V semi-conductors, chalcogenides and other glasses, aluminum nitride, lithium niobate, and others. Such integrated optical resonator structures may find application, for example, in the development of laser systems, devices exploiting frequency conversion, photonic-based quantum simulators and computation devices, photon pair generation systems, heralded photon sources, squeezed light sources, devices exploiting frequency conversion or Raman scattering, and devices for quantum key distribution, as well as short- and long-distance optical communication.

Figure 1:
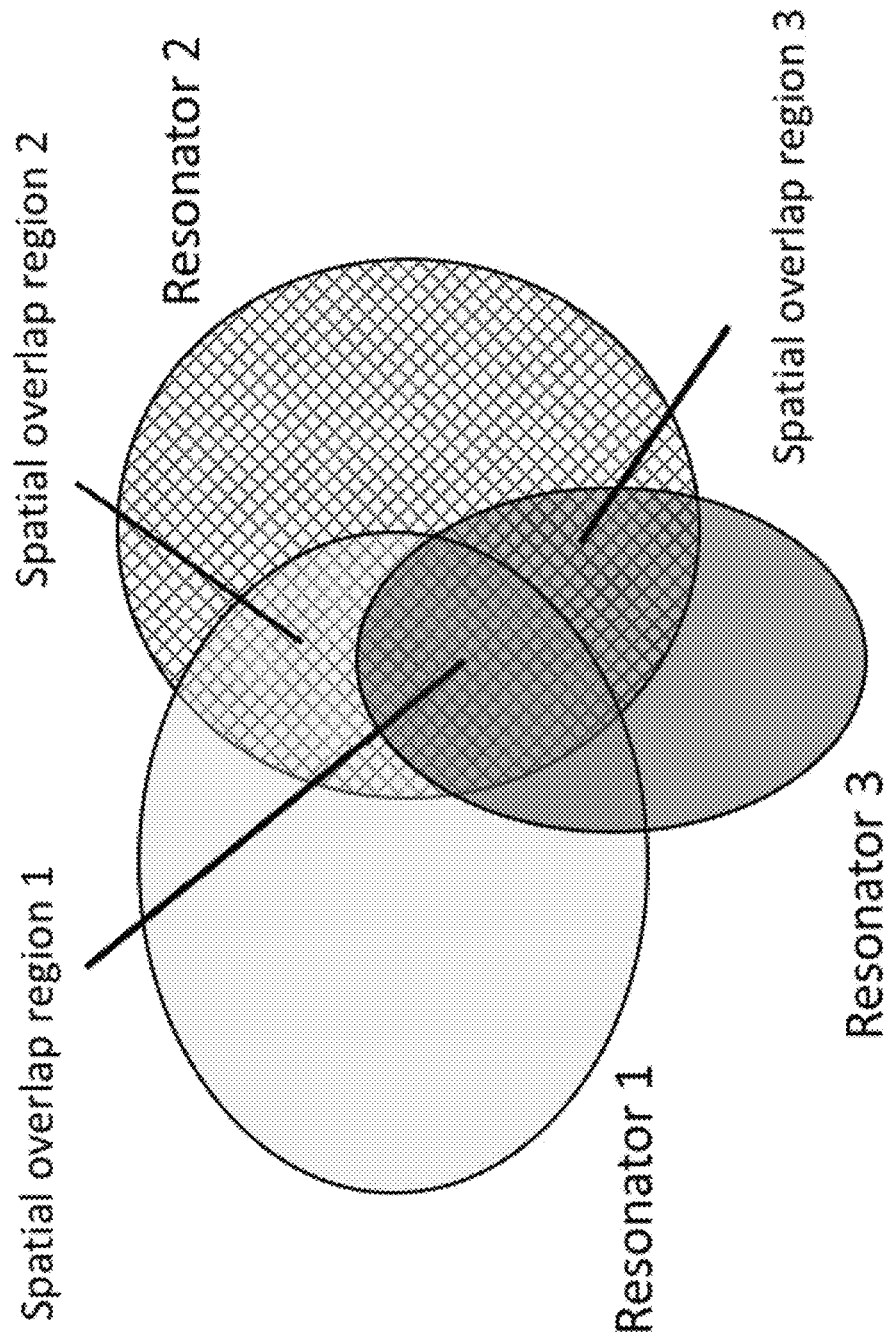
FIG. 1 shows a schematic of an optical resonator arrangement, according to an embodiment.

The optical resonator arrangement is schematically shown in FIG. 1. In particular, FIG. 1 shows a representation of three optical resonators (also referred to herein as "resonators"), the resonant modes of which share one or more common regions of space. Although FIG. 1 shows the representation of three optical resonators, it should be understood that other embodiments can have two optical resonators or more than three optical resonators. The resonators are not (or are weakly) linearly coupled to each other, either because they have different resonance frequencies or because their resonant modes are orthogonal (spatially or in polarization). No linear coupling or weak linear coupling means (aka, substantially no linear coupling), in the ideal case at low power, no energy (or a negligible amount of energy) is transferred between the two resonators. This can be the case even if the optical fields of the two optical resonators have significant spatial overlap, provided they do not have overlapping resonances. Thus, the resonances of each optical resonator can be tuned (almost) independently of the resonances of the other resonators. The overlap region(s) between the different resonators is(are) chosen to maximize (or at least improve) the efficiency of the nonlinear process of interest and to reduce the effects of other parasitic processes.

Conditions that are to be simultaneously fulfilled to efficiently generate and manipulate light using nonlinear processes include, for example, one or more of:
1. sufficient electromagnetic field enhancement;
2. sufficient overlap integral of the electromagnetic fields involved in the process (related to phase matching the desired nonlinear process) in a spatial region having appreciable optical nonlinearity;
3. mitigation of unwanted effects of material and modal chromatic dispersion;
4. mitigation of unwanted nonlinear effects in light propagation, for example those arising from self-phase modulation (SPM) and cross-phase modulation (XPM);
5. suppression, when possible, of any parasitic process that reduces the signal-to-noise ratio or the process efficiency, including for example the generation of spurious unwanted light via parametric fluorescence or Raman scattering;
6. high out-coupling efficiency of the generated or manipulated light compared to intrinsic losses from absorption or scattering; and
7. control over the spectral/temporal correlations and mode structure of the generated light.

Embodiments discussed herein of a resonator arrangement can satisfy all the above-mentioned conditions, even in the presence of material or modal chromatic dispersion. For example, the field enhancement is provided by the presence of resonances at each working frequency (in connection to points (1) and (3)). The resonators share a common spatial region to guarantee (or provide) a non-vanishing overlap integral of the fields involved in the nonlinear interaction (condition (2)). The spectral position as well as the quality factor of each resonance involved in the nonlinear interaction can be tuned independently (condition (1), (5), (6) and (7)). The relative position of the resonance at each working frequency for a given resonator can be adjusted with respect to other resonances for that given resonator that may, or may not, characterize the resonator spectral response, to limit or suppress parasitic processes (condition (4)), thus yielding a light generation device with a much higher signal-to-noise ratio than is achievable in known systems. This tuning of the resonance position of each resonator can also be realized dynamically after fabrication, for example using electro-optic or thermo-optic effects, granting more flexibility. These improvements are especially desirable for quantum photonic devices using parametric fluorescence, as such parasitic processes in general can seriously compromise their functionality for those applications.

One or more embodiments described herein can also be used to enhance Raman scattering (either spontaneous, stimulated, or coherent), with the pump field to be resonant with at least one of the resonators, with Stokes and/or Anti-Stokes field to be resonant with at least another one of the resonators. In other words, one of the resonators can receive a pump field (or pump beam) that is resonant with that resonator; another of the resonators can receive a Stokes and/or Anti-Stokes field (or Stokes and/or Anti-Stokes beam) that is resonant with that other resonator. Raman scattering can come either from the Raman response of the material that constitutes the photonic devices described herein (e.g., the material of the resonator receiving the pump field, or the material of the resonator receiving the Stokes and/or Anti-Stokes field) or from material adsorbed on/deposited on/surrounding the spatial overlap region between at least two resonators.

The following section provides two examples of resonator structures. These resonator structures are compatible with nonlinear optical processes that use continuous wave and/or pulsed light. These two different resonator structures share the properties illustrated in FIG. 1. In both examples, integrated photonic waveguides and micro resonators are considered as basic building blocks. As one can see from these examples, the overlap between the resonator modes can be obtained by exploiting different strategies as evanescent coupling between part of the resonators (e.g. in the two-racetrack approach) or by choosing a proper geometry (e.g. in the three-ring approach).

Two-Racetrack Approach

In the first example, a two-resonator structure 200 comprising two racetrack-shaped resonators 210 and 220 that are separated from each other by a distance d. Each resonator 210 and 220 is coupled to a separate waveguide 230 and 240, respectively, which serves as an optical channel having an input portion and an output portion (see left end portions 231 and 241 and right end portions 232 and 242, respectively). Each resonator 210 and 220 has different resonant frequencies, which depend on the optical length of each closed loop for that resonator. The resonances of one resonator (e.g., resonator 210) can be tuned independently of the resonances of the other resonator (e.g., resonator 220) by adjusting the optical path length of regions that are not shared between the resonators (see, e.g., 211 or 212 of resonator 210, or 221 or 222 of resonator 220). An actuator 250 can be used to adjust the optical path length of regions that are not shared between resonators. In some embodiments, a separate actuator can be coupled to (or associated with) a different resonator from the resonator structure. In other embodiments, the number of actuators can be fewer than the number of resonators in the resonator structure. For example, for a two-resonator structure, one resonator can have (or be associated with) an actuator while the other resonator does not have (or is not associated with) an actuator. A given actuator can be actuated manually or automatically (without human intervention). For example, the actuator can be a metallic heater that induces a local change of the refractive index via the thermo-optical effect. For another example, the actuator can induce a local change of the refractive index change via the electro-optic effect. For yet another example, an automatic actuator can be a controller that calibrates the resonator structure based on linear measurements of the resonator structure. The overlap between the modes of each resonator is guaranteed (or obtained) by light tunneling between the two adjacent waveguides.

The number of resonances involved in the nonlinear interaction depends on the nature of the process under consideration. For example, the case of four-wave mixing involves three different resonances at $\omega_s, \omega_p < \omega_i$, where the conditions $\omega_i = \omega_p + \Delta\omega$ and $\omega_s = \omega_p - \Delta\omega$, for some frequency spacing $\Delta\omega$ are satisfied; i.e., the resonances are equally spaced in frequency. This is to guarantee that energy conservation is satisfied in the nonlinear process. This situation is automatically satisfied for a single racetrack resonator in the absence of group velocity dispersion (GVD) and non-linear effects such as SPM and XPM. In practice, in the presence of large power in the racetrack resonator, dispersion engineering can be used to compensate the SPM and XPM to achieve the desired equally-spaced resonances. In the embodiment shown in FIG. 2, however, dispersion engineering is not necessary: when $\omega_p$ is set to be a resonant frequency of one of the resonators, e.g. resonator 210, and $\omega_s$ and $\omega_i$ are resonance frequencies of resonator 220, the conditions for the nonlinear process of interest to be realized can be satisfied. The frequency position of the two groups of resonances can be adjusted independently by choosing the proper resonator lengths, regardless of the dispersion relation. The interplay between SPM and XPM, which depends on the length L of the interaction region 260 (also referred to herein as an "overlap region," "spatial overlap region" and a "coupling region") and the optical path lengths of the two resonators, can also be controlled in this manner, leading to an effective compensation of the two effects at any power. For example, FIG. 3 shows a graph of field enhancement versus resonance frequencies to for resonator 210 (dotted line) and for resonator 220 (solid line). As shown in FIG. 3 the resonance frequencies for resonator 210 and the resonance frequencies for resonator 220 are separated from each other and non-overlapping.

Figure 2:
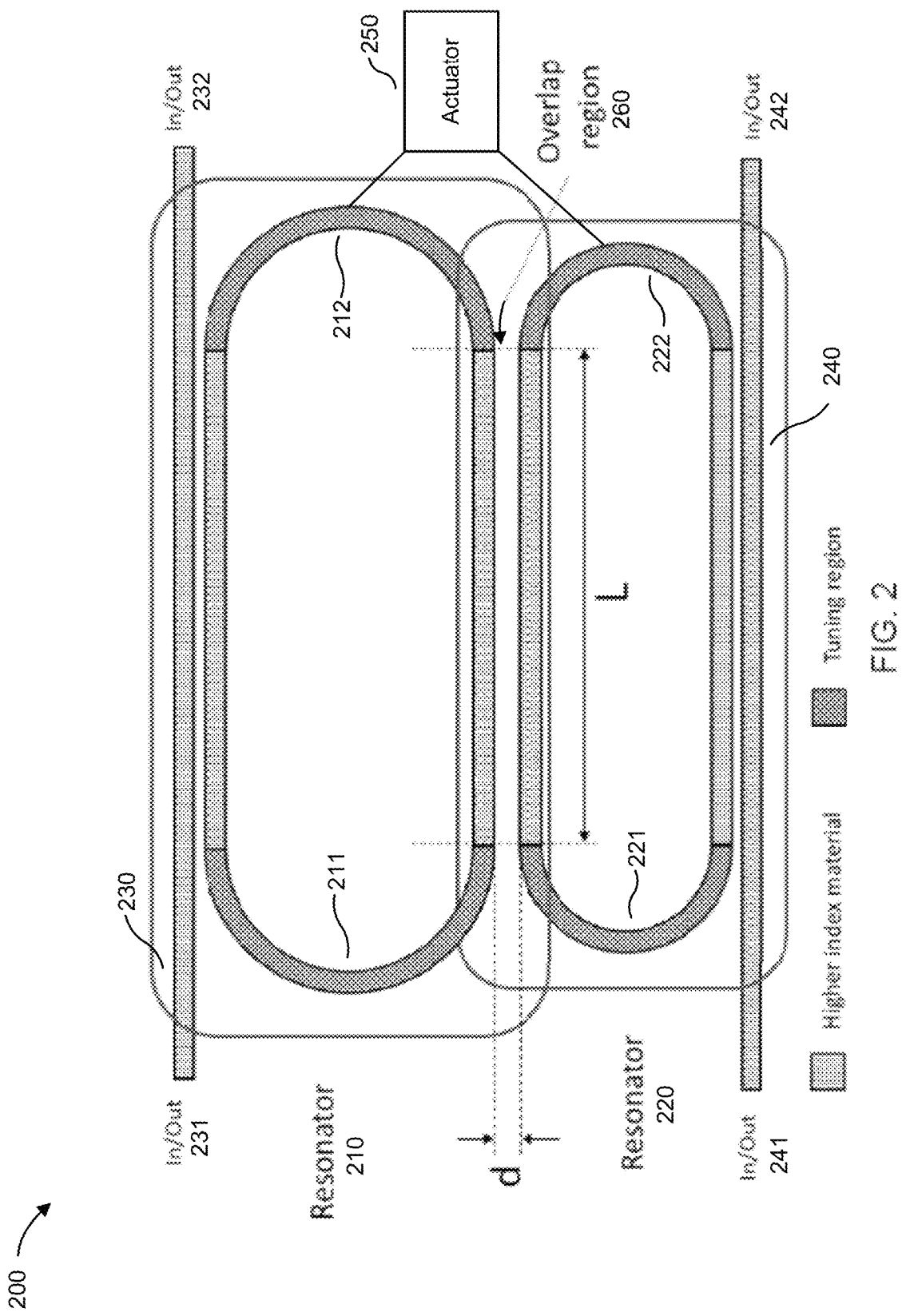
FIG. 2 shows a diagram of a two-resonator photonic device, according to an embodiment.
Figure 3:
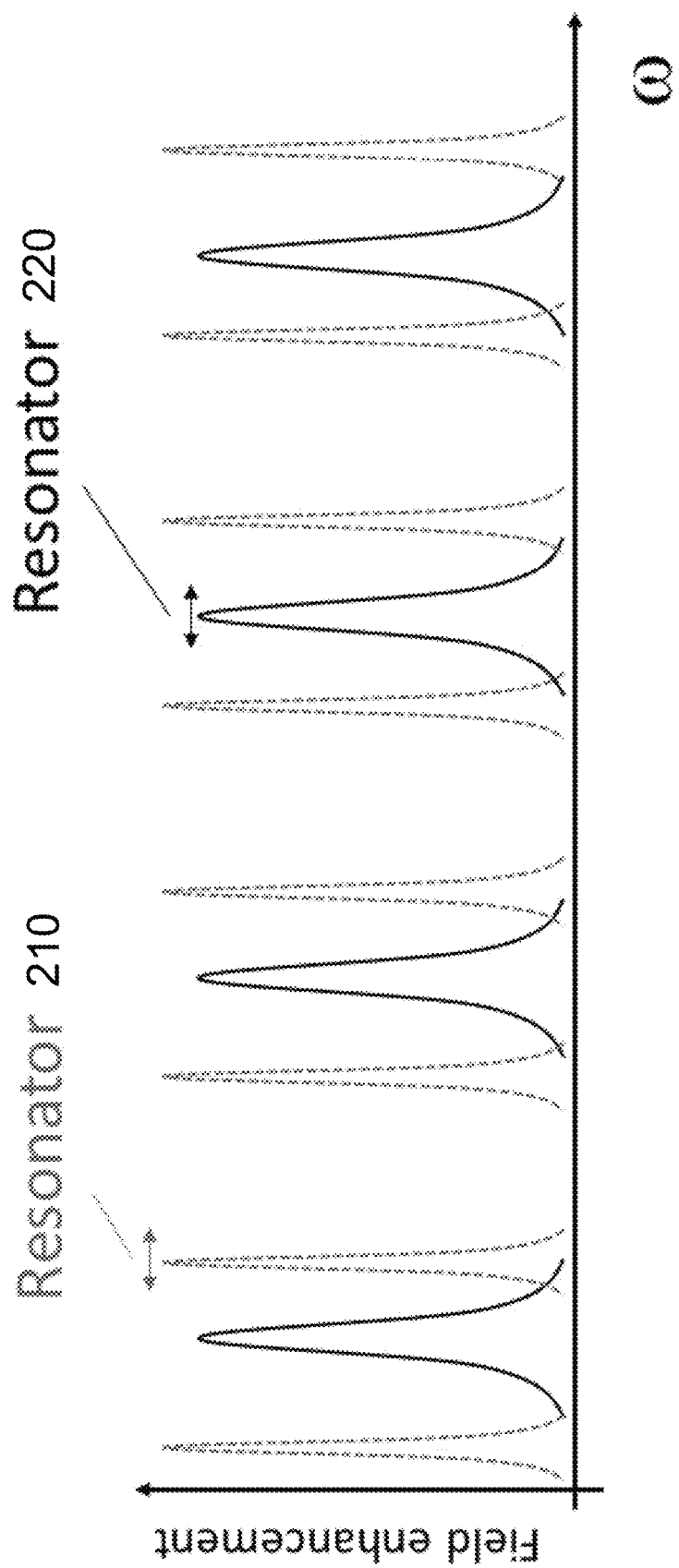
FIG. 3 shows a graph of field enhancement versus frequency to illustrate resonances of the two-resonator optical device of FIG. 2.

In addition, or alternatively, the same device shown in FIG. 2 can operate at different power levels at different times. Operating at such different power levels allows resonance misplacements due to modal dispersion or SPM/XPM to be compensated by readjusting the resonance frequencies of one resonator 210, 220 relative to the resonance frequencies of the other resonator 210, 220 by the use of an actuator(s) (such as actuator 250).

Finally, the length L of the coupling region determines the linear and the nonlinear coupling strength between the two resonators 210 and 220. In particular, two independent conditions should be satisfied:

1. The effective linear coupling between the resonators should be negligible. This can be realized by appropriate choice of the length L as well as the distance d between the two racetrack resonators. Alternatively, interferometric couplers (not shown) or complex directional couplers with actuators (not shown) can be used to control the coupling efficiency over the desired frequency range.

2. If $L_{coh}$ is the coherence length of the nonlinear process considered, i.e., the maximum interaction length over which constructive interference can occur in the nonlinear interaction, one chooses $L=(2m+1)L_{coh}$, with m being a non-negative integer. This choice guarantees the maximum process efficiency, but in fact maximum process efficiency here is not necessary and instead one can simply avoid operating near the condition $L=2mL_{coh}$, which would result in a suppression of the desired nonlinear interaction.

Note that these two conditions can be satisfied independently by a proper choice of L and d. Moreover, a unique choice of L does not exist, which allows for the flexibility to satisfy other fabrication constraints.

Three-Ring Approach

In the second example, a three-resonator structure 400 comprising three microresonators 414, 424 and 426 are arranged to form two linearly uncoupled resonators 410 and 420, also referred to as composite resonators because each can have multiple resonators and/or multiple portions of resonators (see FIG. 4a). In the embodiment shown in FIG. 4a, composite resonator 410 is a single ring 414 of radius $R_1$ coupled to an optical channel 430 at point E, while composite resonator 420 is a compound two-ring resonator having two rings 424 and 426 of radii $R_2$, coupled to two waveguides 440 and 414' in the points A, B, C, and D. For composite resonator 420, the lower waveguide containing the coupling points A and B serves also as an input/output channel 440. The middle waveguide 414' (i.e., the upper waveguide of resonator 320) is the portion of the single ring 414 of radius $R_1$ between C and D.

Figure 4B:
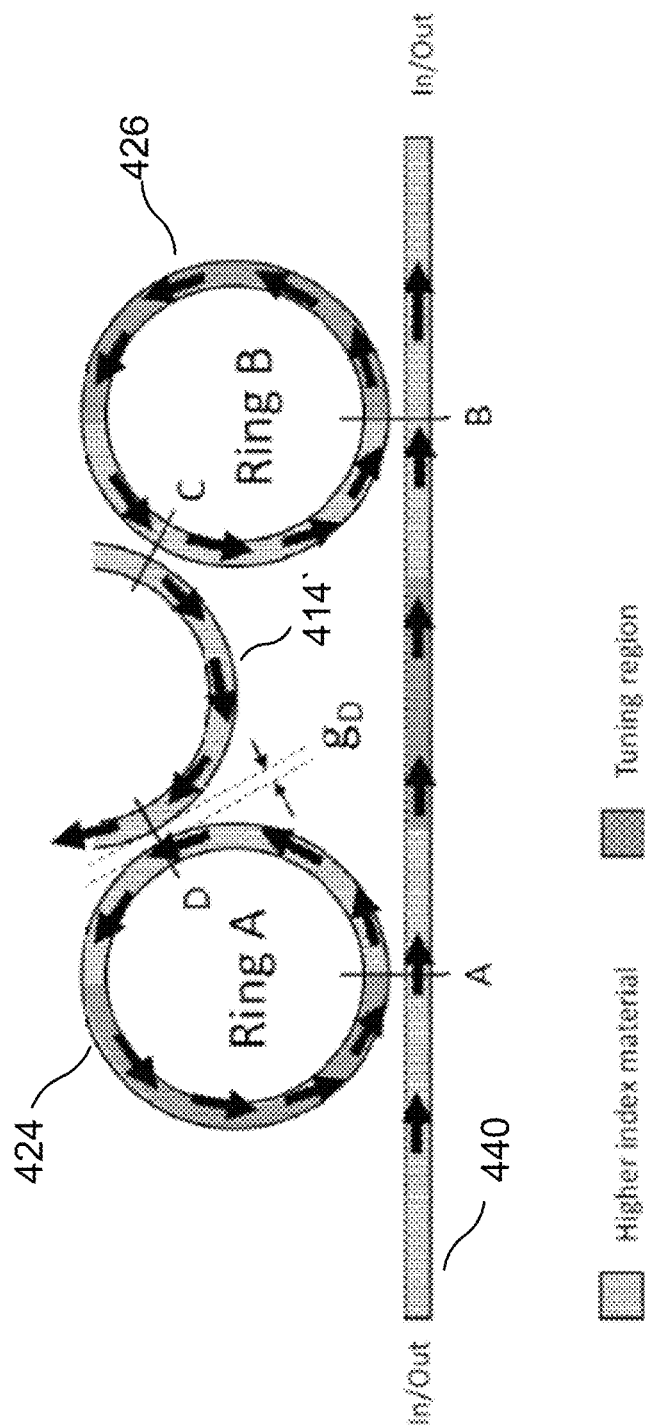

FIG. 4b shows a diagram of a portion of composite resonator 420. This composite resonator 420 is similar to the one disclosed in Philip Chak, J. E. Sipe, and Suresh Pereira, "Depositing light in a photonic stop gap by use of Kerr nonlinear microresonators," Opt. Lett. 28, 1966-1968 (2003), which is incorporated herein by reference. To build composite resonator 320, two identical ring resonators 424 and 426 with radius $R_2$ are shown in FIGS. 4a and 4b, but in fact other kinds of resonators are possible, even resonators having different lengths and shapes, as long as both resonators are resonant at the frequencies of interest. The presence of the desired resonances in the composite resonator 420 depends also on the length given by the sum of the optical lengths of the waveguide segments AB and CD. Note that the resonance condition depends only on the total optical path length, and not on the optical path length of the single segments. This allows for the optimization of the efficiency of a specific nonlinear process, in which the optical length of the segment CD is chosen considering the coherence length $L_{coh}$.

As in the previous examples, all the resonators shown in FIGS. 4a and 4b are linearly uncoupled. Thus, the resonant frequencies of interest of each composite resonator 410, 420 can be adjusted independently both during the design procedure and later during operation by tuning the optical length, for example using thermo-optical or electro-optical effects. The quality factor of each composite resonator 410, 420 can also be tuned independently. For example, the quality factor of composite resonator 410 depends on the coupling at point E, while that of composite resonator 420 depends on the coupling at points A, B, C, and D as well as the relative detuning of resonator 424 and resonator 426.

Various alternative embodiments are possible in addition to those described above with respect to the two-racetrack approach and the three-ring approach. For example, although the various above-described embodiments are essentially planar, non-planar embodiments are possible. For example, the two-racetrack approach can be embodied with the resonators being located within different planes such as the resonator 210 disposed above the resonator 220.

Although the linear waveguides are described above as being parallel and within a common plane, alternatives are possible. For example, the two-racetrack approach can be embodied with either or both of the linear waveguides in a different plane from one or both of the resonators. Similarly, each of the linear waveguides can be in a plane different from the other linear waveguide. In yet another example, either or both of the waveguides can be non-linear, for example, having at least a portion that defines a curved path. This might be particularly advantageous in embodiments of the three-ring approach to alternatively define the resonance of the lower composite resonator 420.

Figure 5:
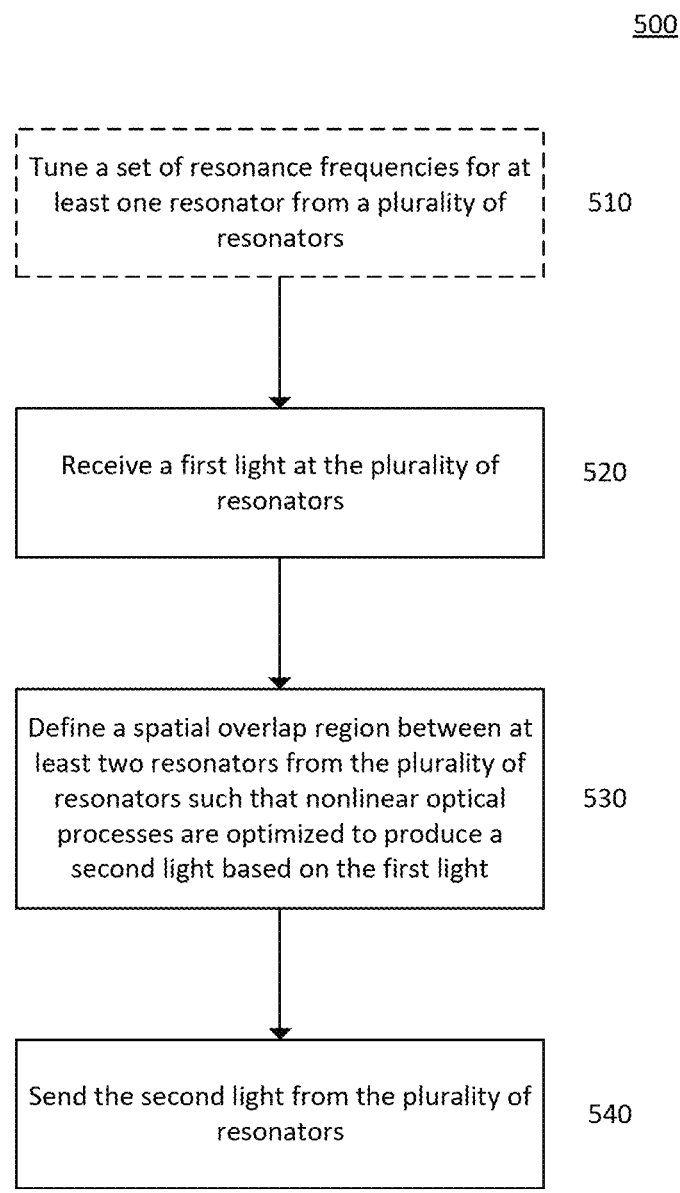
FIG. 5 is a flowchart for a method for operating a resonator photonic device, according to an embodiment.

FIG. 5 is a flowchart for a method for operating a resonator photonic device, according to an embodiment. Such a resonator photonic device can be, for example, any of the resonator structures described above having multiple resonators, where each resonator has its own set of resonance frequencies that have been independently selected from the set of resonance frequencies for the remaining resonators in the resonator structure.

As shown in FIG. 5, the process 500 can begin at 510 with tuning a set of resonance frequencies, which is shown in a dashed box to represent that this step is optional in the sense that it may be performed sometimes and not other times. At 520, the resonator structure receives a light (also referred to as a first light). At 530, the resonator structure defines a spatial overlap region between at least two resonators of the resonator structure such that nonlinear optical processes are substantially optimized to produce modified light (also referred to as a second light) based on the light received at the resonator (the first light). Note that the nonlinear optical processes are substantially optimized in the sense that the nonlinear optical processes are at their best or most efficient, or within a range less than optimal but still sufficient for the photonic device to operate desirably and/or acceptably (e.g., within 1%, 5%, 10%, 15% or 20% within optimized performance). Note that 530 can be performed before 520. At 540, the resonator structure sends the modified light (the second light).

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

What is claimed is:

1. A photonic device, comprising:
   a plurality of resonators, each resonator from the plurality of resonators having a set of resonance frequencies independently selected from a set of resonance frequencies of each remaining resonator from the plurality of resonators, each resonator from the plurality of resonators lacking substantially any linear coupling between each remaining resonator from the plurality of resonators, the plurality of resonators defining a spatial overlap region between at least two resonators from the plurality of resonators such that nonlinear optical processes are substantially optimized during operation; and
   a plurality of optical channels operatively coupled to the plurality of resonators, the plurality of optical channels configured to receive light from the plurality of resonators and configured to send light into the plurality of resonators.

2. The photonic device of claim 1, wherein:
   each resonator from the plurality of resonators has a ring structure and a round-trip optical length that differs from a round-trip optical length of each remaining resonator from the plurality of resonators;
   the spatial overlap region being defined by parallel and evanescently coupled portions of at least two resonators from the plurality of resonators, each resonator from the plurality of resonators defining fields of modes overlapping with at least one remaining resonator from the plurality of resonators during operation;

the plurality of optical channels including a first optical channel and a second optical channel, the first optical channel having an input portion and an output portion, the first optical channel coupled to a first resonator from the plurality of resonators, the second optical channel having an input portion and an output portion, the second optical channel coupled to a second resonator from the plurality of resonators.

3. The photonic device of claim 1, wherein:
the plurality of resonators includes a first resonator, a second resonator and a third resonator, the first resonator and the second resonator each has a round-trip optical length, the third resonator has a round-trip optical length that differs from the round-trip optical length of each of the first resonator and the second resonator;
a portion of the first resonator, a portion of the second resonator and the third resonator collectively defining a first composite resonator;
the first resonator, the second resonator and a portion of the third resonator collectively defining a second composite resonator;
the spatial overlap region disposed where fields of the first composite resonator and the second composite resonator overlap and including the portion of the third resonator; and
the plurality of optical channels including a first optical channel and a second optical channel, the first optical channel coupled to the first composite resonator, the second optical channel coupled to the second composite resonator.

4. The photonic device of claim 1, further comprising:
an actuator operatively coupled to a resonator from the plurality of resonators and configured to tune the set of resonances for that resonator independently from each remaining resonator from the plurality of resonators.

5. The photonic device of claim 1, further comprising:
a plurality of actuators, each actuator from the plurality of actuators operatively coupled to a unique resonator from the plurality of resonators and configured to tune the set of resonances for that resonator independently from each remaining resonator from the plurality of resonators.

6. The photonic device of claim 1, further comprising:
an actuator operatively coupled to a resonator from the plurality of resonators at a local portion of that resonator, and configured to tune the set of resonances for that resonator independently from each remaining resonator from the plurality of resonators,
the actuator being a heater and configured to induce a local change of the refractive index of the local portion of the resonator via the thermal-optical effect.

7. The photonic device of claim 1, further comprising:
an actuator operatively coupled to a resonator from the plurality of resonators at a local portion of that resonator, and configured to tune the set of resonances for that resonator independently from each remaining resonator from the plurality of resonators,
the actuator configured to induce a local change of the refractive index of the local portion of the resonator via the electro-optic effect.

8. The photonic device of claim 1, wherein:
the plurality of resonators are configured to receive a pump field and at least one of a Stokes field or an Anti-Stokes field, the pump field being resonant with a first resonator from the plurality of resonators when the plurality of resonators receives the pump field, the at least one of the Stokes field or the Anti-Stokes field being resonant with a second resonator from the plurality of resonators when the plurality of resonators receives the at least one of the Stokes field or the Anti-Stokes field.

9. A method, comprising:
receiving a first light at a plurality of resonators, each resonator from the plurality of resonators having a set of resonance frequencies independently selected from a set of resonance frequencies of each remaining resonator from the plurality of resonators to substantially avoid any linear coupling among the plurality of resonators;
defining a spatial overlap region between at least two resonators from the plurality of resonators such that nonlinear optical processes are substantially optimized to produce a second light based on the first light; and
sending the second light from the plurality of resonators.

10. The method of claim 9, further comprising:
tuning the set of resonance frequencies for a first resonator from the plurality of resonators independently from each remaining resonator from the plurality of resonators.

11. The method of claim 9, further comprising:
tuning the set of resonance frequencies for each resonator from the plurality of resonators independently from each remaining resonator from the plurality of resonators.

12. The method of claim 9, further comprising:
tuning, via an actuator operatively coupled to a resonator from the plurality of resonators at a local portion of the first resonator, the set of resonance frequencies for that resonator independently from each remaining resonator from the plurality of resonators,
the actuator being a heater and configured to induce a local change of a refractive index of the local portion of that resonator via the thermal-optical effect.

13. The method of claim 9, further comprising:
tuning, via an actuator operatively coupled to a resonator from the plurality of resonators at a local portion of the first resonator, the set of resonance frequencies for that resonator independently from each remaining resonator from the plurality of resonators,
the actuator configured to induce a local change of a refractive index of the local portion of that resonator via the electro-optic effect.

14. The method of claim 9, further comprising:
receiving at the plurality of resonators a pump field and at least one of a Stokes field or an Anti-Stokes field,
the pump field being resonant with a first resonator from the plurality of resonators when the plurality of resonators receives the pump field,
the at least one of the Stokes field or the Anti-Stokes field being resonant with a second resonator from the plurality of resonators when the plurality of resonators receives the at least one of the Stokes field or the Anti-Stokes field.

15. An apparatus, comprising:
a first optical resonator having a set of resonance frequencies and producing an optical field during operation;
a second optical resonator not linearly coupled to the first optical resonator, the second optical resonator having a set of resonant frequencies different from the set of resonance frequencies of the first optical resonator, the second optical resonator producing an optical field during operation that at least partially overlaps with the optical field of the first optical resonator during its operation to produce nonlinear optical processes;

a first optical channel operatively coupled to the first optical resonator; and a second optical channel operatively coupled to the second optical resonator.

16. The apparatus of claim 15, wherein:

the first optical channel is not operatively coupled to the second optical resonator; and the second optical channel is not operatively coupled to the first optical resonator.

17. The apparatus of claim 15, wherein the first optical channel and the second optical channel are collectively configured to receive light from and send light into the first optical resonator and the second optical resonator collectively.

18. The apparatus of claim 15, wherein:

each of the first optical resonator and the second optical resonator from the plurality of resonators has a ring structure and a round-trip optical length that differs from a round-trip optical length of the remaining of the first optical resonator and the second optical resonator;

the spatial overlap region being defined by parallel and evanescently coupled portions of the first optical resonator and the second optical resonator, each of the first optical resonator and the second optical resonator defining fields of modes overlapping with the remaining of the first optical resonator and the second optical resonator during operation;

the first optical channel having an input portion and an output portion, the first optical channel coupled to the first optical resonator, the second optical channel having an input portion and an output portion, the second optical channel coupled to the second optical resonator.

19. The apparatus of claim 15, further comprising:

a third optical resonator, the first optical resonator and the second optical resonator each has a round-trip optical length, the third optical resonator has a round-trip optical length that differs from the round-trip optical length of each of the first optical resonator and the second optical resonator;

a portion of the first optical resonator, a portion of the second optical resonator and the third optical resonator collectively defining a first composite resonator;

the first optical resonator, the second optical resonator and a portion of the third optical resonator collectively defining a second composite resonator;

the spatial overlap region disposed where fields of the first composite resonator and the second composite resonator overlap and including the portion of the third optical resonator; and the first optical channel coupled to the first composite resonator, the second optical channel coupled to the second composite resonator.

20. The apparatus of claim 15, further comprising:

an actuator operatively coupled to the first optical resonator and configured to tune the set of resonances for the first optical resonator independently from the second optical resonator.

* * * * *